United States Patent
DeLarm

(10) Patent No.: US 12,503,954 B2
(45) Date of Patent: Dec. 23, 2025

(54) CENTER-TIE SHAFT TENSIONING

(71) Applicant: RTX Corporation, Farmington, CT (US)

(72) Inventor: Justin Roger DeLarm, Bolton, CT (US)

(73) Assignee: RTX Corporation, Farmington, CT (US)

( * ) Notice: Subject to any disclaimer, the term of this patent is extended or adjusted under 35 U.S.C. 154(b) by 0 days.

(21) Appl. No.: 18/744,126

(22) Filed: Jun. 14, 2024

(65) Prior Publication Data

US 2025/0382894 A1 Dec. 18, 2025

(51) Int. Cl.
*F01D 15/08* (2006.01)
*B64C 11/04* (2006.01)

(52) U.S. Cl.
CPC .............. *F01D 15/08* (2013.01); *B64C 11/04* (2013.01); *F05D 2220/32* (2013.01); *F05D 2240/60* (2013.01)

(58) Field of Classification Search
CPC .......... F01D 15/08; F01D 5/06; F04D 29/043; F05D 2220/32; F05D 2240/60; B64C 11/04
See application file for complete search history.

(56) References Cited

U.S. PATENT DOCUMENTS

| | | | |
|---|---|---|---|
| 2,804,323 A * | 8/1957 | Willia | F01D 5/025 403/194 |
| 4,737,076 A | 4/1988 | Bonner et al. | |
| 4,836,750 A | 6/1989 | Modafferi et al. | |
| 5,537,814 A | 7/1996 | Nastuk et al. | |
| 5,628,621 A | 5/1997 | Toborg | |
| 6,089,828 A * | 7/2000 | Hollis | C23C 4/00 416/241 R |
| 8,517,687 B2 | 8/2013 | Benjamin et al. | |
| 8,684,696 B2 | 4/2014 | Ress, Jr. | |
| 9,932,832 B2 | 4/2018 | Wang et al. | |
| 2007/0107219 A1* | 5/2007 | Suciu | F01D 5/066 29/525.01 |
| 2007/0286733 A1* | 12/2007 | Bouchard | F01D 5/066 416/204 R |
| 2013/0177407 A1* | 7/2013 | Farineau | F01D 5/063 29/889.3 |
| 2015/0345294 A1* | 12/2015 | Wang | F01D 5/027 73/468 |
| 2021/0040892 A1* | 2/2021 | Stoyanov | F01D 5/34 |

FOREIGN PATENT DOCUMENTS

| | | |
|---|---|---|
| EP | 3708772 A1 | 9/2020 |
| EP | 4257851 A1 | 10/2023 |

OTHER PUBLICATIONS

European Search Report dated Nov. 3, 2025 for European Patent Application No. 25182831.5.

* cited by examiner

*Primary Examiner* — Nathaniel E Wiehe
*Assistant Examiner* — Theodore C Ribadeneyra
(74) *Attorney, Agent, or Firm* — Bachman & LaPointe, P.C.

(57) ABSTRACT

A turbine engine rotor has: a central shaft; a disk stack having a plurality of disks encircling the shaft and having a hub mounted to the shaft; a nut threaded to the shaft; and a spacer between the hub and the nut, the nut holding the stack in compression via the spacer. The hub has a compartment at least partially containing the spacer with an outer wall inner diameter surface facing an outer diameter surface of the spacer.

20 Claims, 4 Drawing Sheets

CENTER-TIE SHAFT TENSIONING

BACKGROUND

The disclosure relates to gas turbine engines. More particularly, the disclosure relates to providing shaft tension in center-tie rotors.

Gas turbine engines (used in propulsion and power applications and broadly inclusive of turbojets, turboprops, turbofans, turboshafts, industrial gas turbines, and the like) often feature rotors wherein a shaft passes centrally through a rotor disk stack with engagement between the shaft and stack such that the shaft is held in tension and the stack is held in compression.

One example involves the high pressure compressor (HPC) section of the high spool of a two-spool engine. The HPC comprises a stack of disks with an aft hub having an inner hub branch (or "kickstand") extending radially inward and rearward to receive the shaft in close fit. A nut on the shaft bears against a face (aft axial (radially-extending) face) of the kickstand to hold the shaft in tenson and stack in compression. Example hub and nut materials are nickel-based superalloys. There may be an anti-gallant coating at the interface. For example, the coating may be applied to the forward end (axial face) of the nut. Example anti-gallant coating is $MoS_2$ and/or graphite (e.g., brushed on in a carrier/solvent).

The high pressure turbine (HPT) disk stack is also held to the shaft aft of the HPC. Accordingly, an additional connection between HPC and HPT is made radially outboard of the shaft. This may involve a second (outer) hub (or "backbone") structure of the HPC aft hub extending aft and radially inward spaced radially outboard of the first (inner) hub. This outer hub may be mated to a corresponding forwardly-extending outer hub of the HPT stack to transmit driving torque from the HPT to HPC. Depending upon the particular engine configuration, the mating backbone HPC rear hub and HPT forward hub may have mating coupling moieties such as splines or curvic coupling moieties. The kickstand and backbone branch from a forward portion of the HPC aft hub that extends aftward and radially inward from a rim section of an associated disk.

One example of such a hub configuration is shown in U.S. Pat. No. 8,517,687 (the '687 patent), "Gas Turbine Engine Compressor and Turbine Section Assembly Utilizing Tie Shaft", of Benjamin et al., Aug. 27, 2013, the disclosure of which is incorporated by reference in its entirety herein as if set forth at length.

SUMMARY

One aspect of the disclosure involves a turbine engine rotor comprising: a central shaft; a disk stack having a plurality of disks encircling the shaft and having a hub mounted to the shaft; a nut threaded to the shaft; and a spacer between the hub and the nut, the nut holding the stack in compression via the spacer. The hub has a compartment at least partially containing the spacer with an outer wall inner diameter surface facing an outer diameter surface of the spacer.

In a further example of any of the foregoing, additionally and/or alternatively, the spacer is in radial interference fit with the compartment.

In a further example of any of the foregoing, additionally and/or alternatively, the spacer comprises a metallic substrate.

In a further example of any of the foregoing, additionally and/or alternatively, the spacer comprises a CuAl coating on the metallic substrate.

In a further example of any of the foregoing, additionally and/or alternatively, the metallic substrate comprises a CoCrW alloy.

In a further example of any of the foregoing, additionally and/or alternatively, the hub and the nut are Ni-based alloys.

In a further example of any of the foregoing, additionally and/or alternatively, the shaft is under axial tension and the stack is under axial compression.

In a further example of any of the foregoing, additionally and/or alternatively, the compartment is on an inner hub branch of the hub and an outer hub branch of the hub surrounds the inner branch and has a spline or curvic coupling moiety.

In a further example of any of the foregoing, additionally and/or alternatively, the spacer has a radial span and an axial length of 40% to 200% of said radial span.

In a further example of any of the foregoing, additionally and/or alternatively, the spacer has a rectangular cross-section, optionally with chamfered or rounded corners.

In a further example of any of the foregoing, additionally and/or alternatively, the spacer has an axial length and the compartment has an axial length of 70% to 150% of said spacer axial length.

In a further example of any of the foregoing, additionally and/or alternatively, there is no $MoS_2$ and/or graphite coating at an interface of the spacer and hub or an interface of the spacer and the nut.

In a further example of any of the foregoing, additionally and/or alternatively, the spacer is a non-split full annulus.

A further aspect of the disclosure involves a gas turbine engine including the turbine engine rotor wherein the rotor is a high pressure compressor rotor and the engine further comprising a high pressure turbine rotor co-spooled with the high pressure compressor rotor and coupled to the high pressure compressor rotor via an outer hub of the high pressure compressor rotor surrounding the hub.

A further aspect of the disclosure involves a method for manufacturing the turbine engine rotor, the method comprising: interference fitting the spacer to the compartment; after the interference fitting, assembling the hub to the shaft; and after the assembling, threading the nut to the shaft.

A further example of any of the foregoing may additionally and/or alternatively include: applying force to precompress the hub to the shaft and/or pretension the shaft; threading or further threading the nut to the shaft while the force is applied; and releasing the force to the leave the nut holding the stack in compression via the spacer.

A further aspect of the disclosure involves a method for using the turbine engine rotor the method comprising: driving rotation of the rotor; and the driving causing a fracture of the spacer and the outer wall inner diameter surface containing fragments of the fracture.

A further aspect of the disclosure involves a turbine engine rotor comprising: a central shaft; a disk stack having a plurality of disks encircling the shaft and having a hub mounted to the shaft; a nut threaded to the shaft to hold the disk stack in compression and the shaft in tension; and an annular spacer between the hub and the nut. The hub further comprises means for radially restraining the spacer.

In a further example of any of the foregoing, additionally and/or alternatively, one or more of: the means has an inner diameter surface radially spaced from the shaft by not more than 150% of a radial span of the spacer; the spacer has a radial span and an axial length of 40% to 200% of said radial span; the spacer comprises by weight at least 90% CoCrW alloy; the rotor is a high-pressure compressor rotor of a multi-spool engine; and the spacer is a Co-based alloy and the nut and hub are nickel-based alloys.

In a further example of any of the foregoing, additionally and/or alternatively, the spacer is in a radial interference fit with the hub.

The details of one or more embodiments are set forth in the accompanying drawings and the description below. Other features, objects, and advantages will be apparent from the description and drawings, and from the claims.

BRIEF DESCRIPTION OF THE DRAWINGS

Like reference numbers and designations in the various drawings indicate like elements.

DETAILED DESCRIPTION

Figure 2:
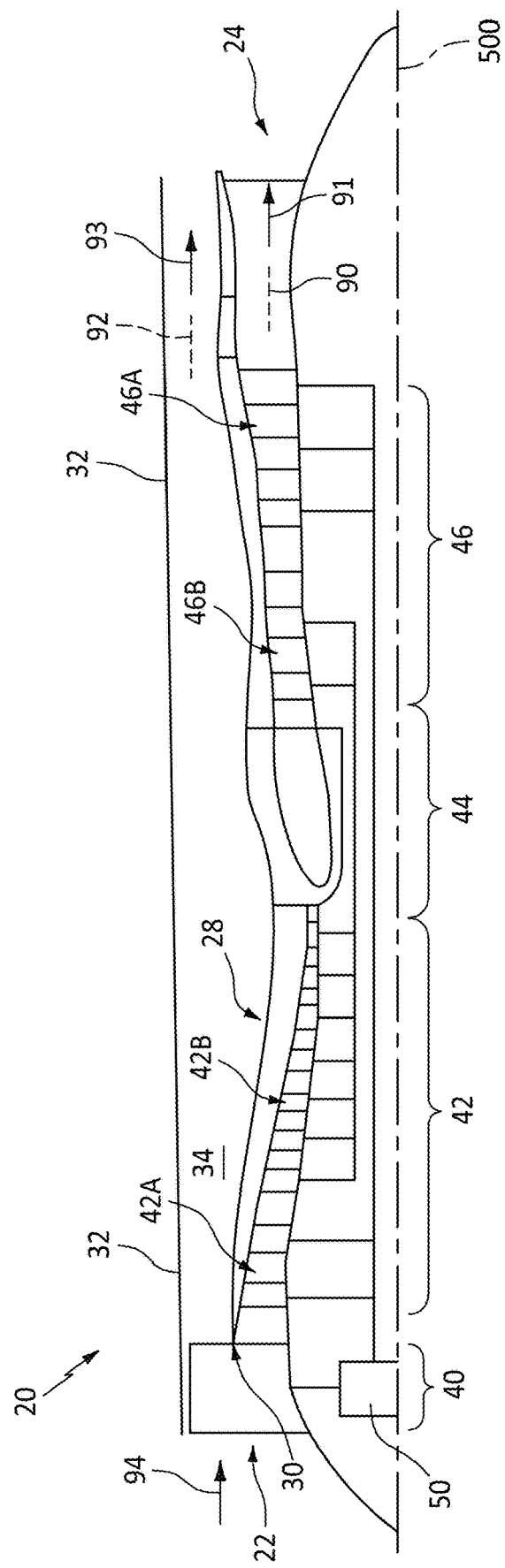
FIG. 2 is a schematic half section of a turbofan engine.

FIG. 2 shows a gas turbine engine 20. As is discussed below, the engine is illustrated as a schematic modification of a baseline existing engine. FIG. 2 schematically shows the example gas turbine engine 20 as a turbofan engine having a centerline or central longitudinal axis 500 and extending from an upstream end at an inlet 22 to a downstream end at an outlet 24. The example engine schematically includes a core flowpath or gaspath 90 passing a core flow 91 and a bypass flowpath 92 passing a bypass flow 93. The core flow and bypass flow are initially formed by respective portions of a combined inlet airflow 94 divided at a splitter 30. Thus, the example core flow starts out as air and downstream of the combustor comprises combustion products as combustion gas.

A core case (inner diameter (ID) case) or other structure 28 divides the core flowpath from the bypass flowpath. The bypass flowpath is, in turn, surrounded by an outer case (outer diameter (OD) case) 32 which, depending upon implementation, may be a fan case. A bypass duct 34 is configured radially between the ID case and OD case. From upstream to downstream, the engine includes a fan section 40 having one or more fan blade stages, a compressor 42 having one or more sections 42A, 42B each having one or more blade stages, a combustor 44 (e.g., annular, can type, or reverse flow), and a turbine 46 again having one or more sections 46A, 46B each having one or more blade stages. For example, many so called two-spool engines have two compressor sections (low pressure 42A and high pressure 42B) and two turbine sections (high pressure 46B and low pressure 46A) with each turbine section driving a respective associated compressor section and the low pressure downstream turbine section 46A also driving the fan (optionally via a gear reduction 50). Yet other arrangements are possible.

Various illustrated and non-illustrated features of the engine may be otherwise conventional including basic control hardware, programming, and use and manufacture methods.

Figure 1:
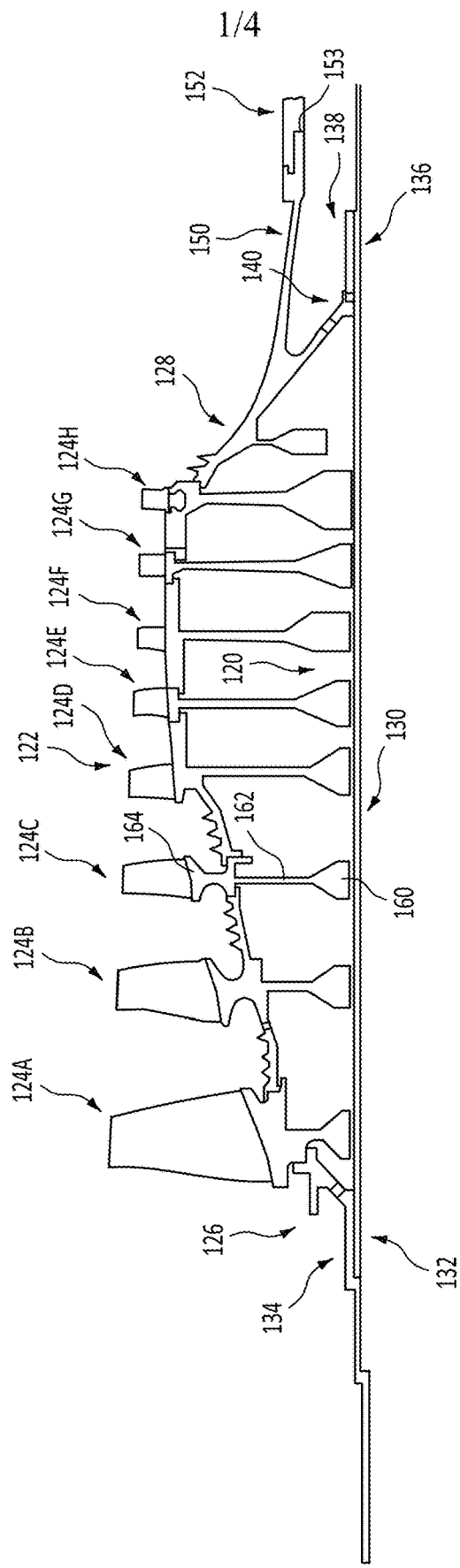
FIG. 1 is a half sectional view of a high pressure compressor (HPC) rotor.

FIG. 1 shows a portion of a high spool assembly generally consistent with that of the '687 patent. The example assembly includes an HPC rotor 122. The example rotor comprises a stack of disks 124A-124H. In this particular example, disks 124A-124G are known as "integrally-bladed rotors" (IBR) or "bladed disks" (blisks); whereas, the disk 124H has a circumferential array of blades mounted at the outer rim of the disk. The various disks have spacers (optionally separate pieces) extending fore or aft to mate with adjacent disks. FIG. 1 shows some of these spacers having radially inwardly open/facing distal shoulder surfaces receiving shoulders of the adjacent disk whereas others have radially outwardly open/facing shoulder surfaces. For example, the disk 124B has a forward spacer with a radially inwardly open shoulder and a rearward spacer with a radially outwardly open shoulder. Some of the spacers have radially outwardly protruding knife edges for cooperating with abradable material at inboard/inner platforms or shrouds of vane stages to create respective knife edge sealing systems.

The disk stack is held in axial compression between a forward hub 126 and an aft or rearward hub 128 to form a rotor stack. The term "rotor" is often interchangeably used to identify anything from a single disk (e.g., as in IBR noted above), expanding in scope to the disk stack (without hubs or shaft), then further to the extent of including the hubs and the shaft but only within a given section (e.g., treating the HPC and HPT rotor sections as distinct rotors), and up to an entire structure that rotates as a unit (which would include the HPC rotor, the HPT rotor, and the shaft all as a high speed rotor).

The example fore and aft hubs each have distal radially outwardly open shoulders mating with the adjacent disk. A tension shaft 130 holds the rotor under compression while the adjacent portion of the shaft is under tension. The example shaft 130 has an externally threaded forward end section 132 engaged to an internally threaded compartment 134 of the forward hub to transmit axial forces. The shaft 130 also has a second externally threaded portion 136 well aft thereof receiving a nut 138. The nut 138 holds a so-called kickstand portion (or inner hub) 140 of the aft hub 128 in axial compression to complete the compressive force transmission path through the rotor. The example aft hub 128 also has an outer hub or driving section 150 (or "backbone") coupled to a corresponding forward portion 152 of the HPT rotor to allow the HPT rotor to drive rotation of the HPC rotor. In various embodiments, the shaft 130 may continue through to join with or become an HPT shaft. In the example shown, the hub 126 forward of the junction between the threaded sections 132 and 134 again becomes a portion of a high spool shaft and may mate with bearings, accessory drives, and the like.

The various disks have radially inboard protuberant bores 160 connected via thinner intermediate radial webs 162 to outer rim sections 164.

In operation, some center-tie HPCs utilize anti-gallant ($MoS_2$ and/or graphite in a carrier) on the coupling nut end face contacting the aft HPC hub. Unevenness in the distribution can cause squareness errors in the load path and subsequently significant module unbalance. By introducing a spacer 200 (FIG. 1A) between the nut 138 and inner hub or kickstand 140 in place of the coating, such errors may be mitigated. As discussed below, the spacer may be or have a CoCrW alloy substrate for engaging a nickel-based superalloy hub and a nickel-based superalloy nut.

The example spacer has a generally rectangular cross-section whose aspect ratio is discussed further below. Optionally, the corners of such rectangular cross-section may be rounded or chamfered so as to limit stress. This may be particularly relevant to the forward outer diameter corner which is adjacent to an internal corner of the compartment.

Such rounding or chamfering may eliminate local contact and stress concentrations. The example spacer is a non-split continuous full annulus.

Figure 1A:
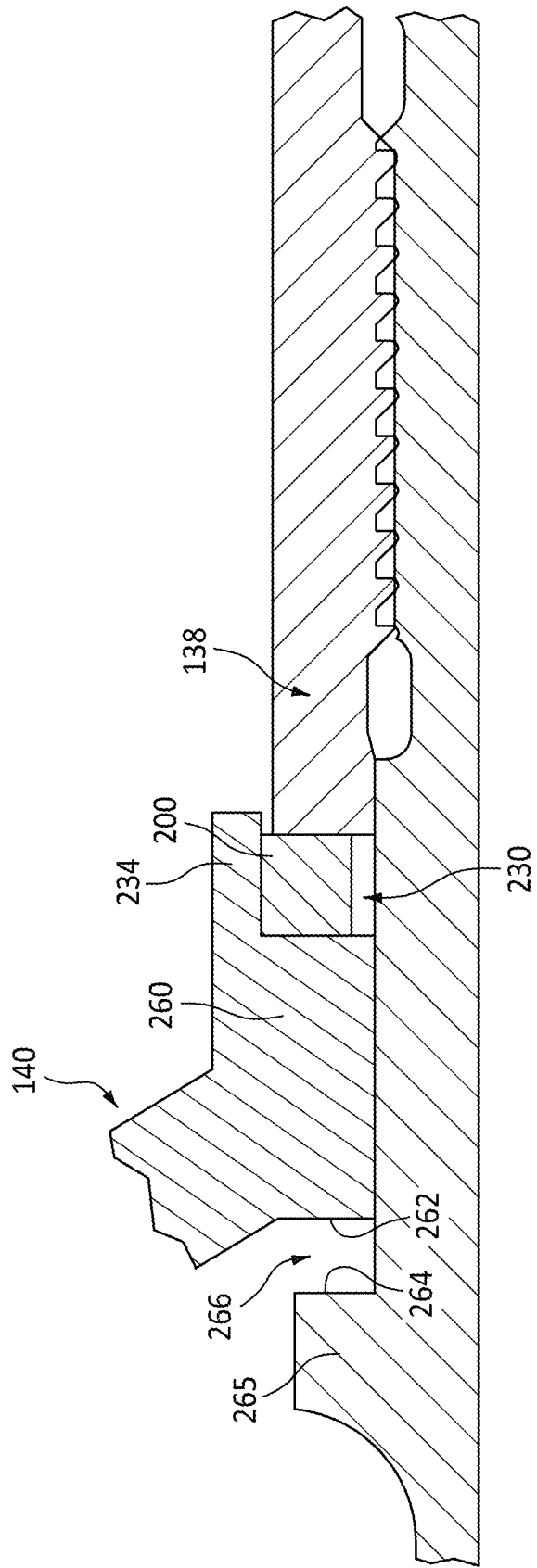
FIG. 1A is an enlarged view of an aft hub kickstand area of the rotor of FIG. 1.
Figure 1B:
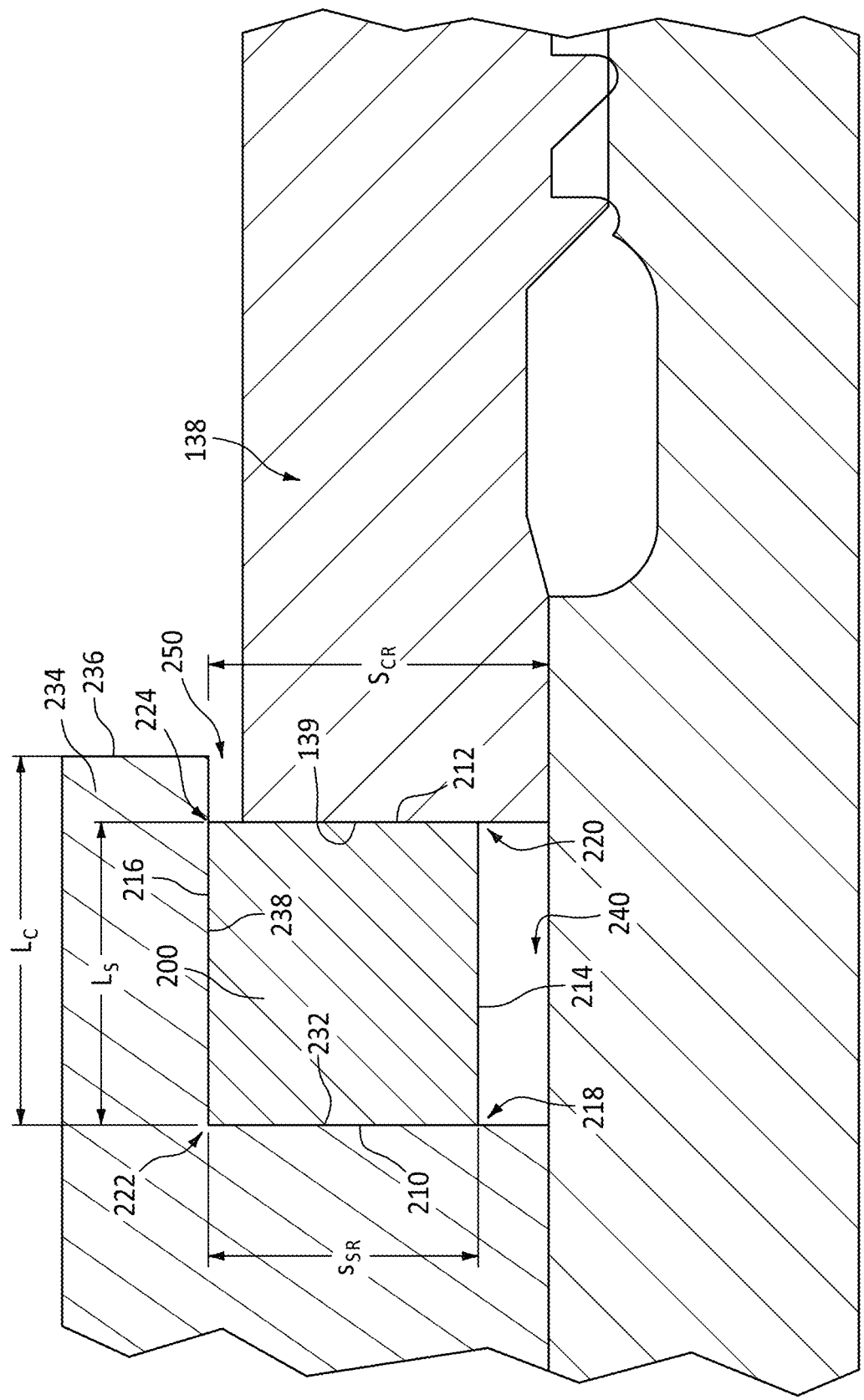
FIG. 1B is a further enlarged view.

FIG. 1B shows the spacer as having a forward face 210, and aft face 212, an ID face 214, and an OD face 216 with respective forward inner 218, aft inner 220, forward outer 222, and aft outer 224 corners.

An optional coating on at least axial end faces of the spacer may be a CuAl coating functioning to reduce galling. Such coating may be applied by thermal spray such as air plasma spray (APS).

Relative to the alloy of the nut and the alloy of the hub, the spacer alloy may have dissimilar material properties to mitigate galling propensity. For example, spacer material may be selected for oxide formation to provide lubricity and reduce abrasive wear. Also, dissimilar composition of the spacer to the nut and hub inhibits diffusion and reduces adhesive wear.

A specific hub material is a powder metallurgical Ni-based alloy.

A specific nut material is wrought Ni-based alloy such IN-718 (UNS N07718/W.Nr. 2.4668, Inconel® alloy 718 Huntington Alloys Corp., Huntington, West Virginia).

A specific CoCrW spacer material is Stellite™ 6B of Kennametal Inc., Pittsburgh, Pennsylvania. The use of a Co-based alloy may limit interdiffusion relative to the mating hub and nut Ni-based alloys. Also, the CoCrW alloys are subject to surface oxide formation at temperature. This may provide a lubricious interaction with the mating surfaces. In general, key such Stellite™ and other relevant CoCrWC alloys may have Co as a largest by-weight constituent, at least 18.0 weight percent Cr (e.g., 18.0 to 35.0 or 20.0 to 32.0), at least 2.5 W (e.g. 2.5 to 22.0), 0.6-2.0 C, up to, if any, one or more of 11.0 Ni, 5.0 Fe, 2.0 Mn, 2.0 Si, 2.0 Mo, 2.0 V, 1.0 B, and up to impurity levels of yet others (e.g. up to 0.5 or 1.0 individually and 2.0 or 5.0 aggregate others). Cr may be the second largest by weight constituent.

Due to the possibility of fracture of a spacer, the hub (specifically the kickstand) may be reconfigured from a baseline so as to form a rearwardly and radially-inwardly open compartment 230 (FIG. 1A) receiving the spacer and radially containing it (or fragments from it). The compartment is at an aft end of the kickstand and has an aft-facing forward or base surface 232 (FIG. 1B) for contacting the spacer forward end surface and forming a compartment base. A sleeve section 234 of the kickstand extends aft from the compartment base to an aft rim 236 and has an inner diameter surface 238 forming a compartment sidewall surface. In one group of examples, the spacer OD surface is in interference fit with the ID surface 238 of the sleeve section (e.g., a thermal interference fit). This may provide a radial gap/clearance 240 between the spacer ID surface and the adjacent OD surface of the shaft. Another group of examples has a clearance fit at the OD of the spacer/ID surface of the sleeve section.

A spacer radial span is shown as $S_{SR}$ and a spacer axial length or span/thickness is shown as $L_S$. Example $L_S$ is 0.050 inch to 1.0 inch (1.27 millimeter to 25 millimeters, more particularly, 2.5 millimeters to 6.0 millimeters, more particularly 3.5 millimeters to 4.5 millimeters).

A compartment length is shown as $L_C$. A compartment radial span (measured relative to the adjacent shaft OD surface) is $S_{CR}$.

An example compartment slightly overlaps or underlaps the nut. (e.g., $L_C$ is an example 70% to 200% of $L_S$). Alternative lower ends on that range are 95%, 100%, and 110%. Alternative upper ends are 150%, 130% and 120%.

The higher upper limits may be to allow a round edge or chamfer at the junction of surfaces 236 and 139 (particularly for low values of $L_S$).

In terms of radial span, the compartment radial span is at least that of the spacer and up to an example 200%. More particularly, 100% to 150%. with alternate lower ends of 105% and 110% and alternate upper ends of 115% and 120%.

An example spacer cross-section is close to square with $L_S$ and $S_{SR}$ being about the same. For example, $L_S$ may be 40% to 200% of $S_{SR}$, more particularly, 50% to 150%. This aspect ratio is believed to provide a threshold minimum thickness for integrity (e.g., about 0.050 inch (1.27 mm)) while providing a similar radial span to the axial face of the nut. Alternative thickness ranges are 1.27 millimeter to 25 millimeters.

The aft end/face 212 of the spacer contacts the forward end 139 of the nut. In the illustrated example, there is an axial overlap of the kickstand sleeve section 234 with the nut leaving a gap or radial clearance 250 therebetween. An axial span of this overlap may be substantially less than the spacer length $L_S$ (e.g., less than 50% thereof or an example 10-50%). An example radial span of the clearance or gap 250 is again substantially less than $S_{SR}$ (e.g., less than 20% thereof or an example 5% to 20%).

FIG. 1A also shows a foot portion 260 of the kickstand. In a normal condition, the example foot portion has a forward end or heel 262 spaced apart from an axial (radially-extending) shoulder surface 264 of a shoulder 265 by a gap 266. The shoulder may be formed by a radially protruding flange. The gap 266 allows for the pre-tensioning or pre-compressing prior to partial relaxation in assembly and to provide shaft shear failure mode mitigation.

In use, while engineering analysis may substantiate the spacer will have stress sufficiently low to not fracture, a flight safety failure mode may still exist in a hypothetical situation where a fractured spacer can liberate and the and the preload holding the HPC section together would be lost potentially during flight. The sleeve section will tend to contain any fragments.

Component materials and manufacture techniques and assembly techniques may be otherwise conventional. Additionally, the spacer may be manufactured by machining from a forged billet or bar or via additive manufacture.

The spacer may be preassembled in a radial interference fit (e.g., a thermal interference fit) to the compartment (e.g., by inductively heating the kickstand and inserting the spacer and allowing the kickstand to cool). Stack up of the HPC rotor and pretensioning/precompressing may be otherwise as in a baseline. For example, the nut installed over the aft end of the shaft. The aft end of the shaft may be pulled against a counterforce applied to the aft end 153 of the backbone 150 (prior to mating with the HPT stack forward portion 152). This pretensioning of the shaft and precompressing of the stack allows the nut to be threaded into place. This causes nut and spacer to contact. The external forces are released increasing the spacer to nut to kickstand compression and leaving the stack in precompression and the shaft in pretension.

In an example redesign from a baseline, a most basic example involves merely machining the compartment into the existing envelope of the kickstand foot. An alternative involves forming the kickstand with an extended foot including the compartment. In this latter case, the nut may be foreshortened relative to the baseline nut.

The use of "first", "second", and the like in the following claims is for differentiation within the claim only and does not necessarily indicate relative or absolute importance or temporal order. Similarly, the identification in a claim of one element as "first" (or the like) does not preclude such "first" element from identifying an element that is referred to as "second" (or the like) in another claim or in the description.

Where a measure is given in English units followed by a parenthetical containing SI or other units, the parenthetical's units are a conversion and should not imply a degree of precision not found in the English units.

One or more embodiments have been described. Nevertheless, it will be understood that various modifications may be made. For example, when applied to an existing baseline engine or rotor configuration, details of such baseline may influence details of particular implementations. Accordingly, other embodiments are within the scope of the following claims.

What is claimed is:

1. A turbine engine rotor comprising:
   a central shaft;
   a disk stack having a plurality of disks encircling the shaft and having a hub mounted to the shaft;
   a nut threaded to the shaft; and
   a spacer between the hub and the nut, the nut holding the stack in compression via the spacer, wherein:
   the spacer has a radial span and an axial length of 40% to 200% of said radial span: and
   the hub has a compartment at least partially containing the spacer with an outer wall inner diameter surface facing an outer diameter surface of the spacer.
2. The turbine engine rotor of claim 1 wherein:
   the spacer is in radial interference fit with the compartment.
3. The turbine engine rotor of claim 1 wherein:
   the spacer comprises a metallic substrate.
4. The turbine engine rotor of claim 3 wherein:
   the spacer comprises a CuAl coating on the metallic substrate.
5. The turbine engine rotor of claim 3 wherein:
   the metallic substrate comprises a CoCrW alloy.
6. The turbine engine rotor of claim 5 wherein:
   the hub and the nut are Ni-based alloys.
7. The turbine engine rotor of claim 1 wherein:
   the shaft is under axial tension; and
   the stack is under axial compression.
8. The turbine engine rotor of claim 7 wherein:
   the compartment is on an inner hub branch of the hub; and
   an outer hub branch of the hub surrounds the inner branch and has a spline or curvic coupling moiety.
9. The turbine engine rotor of claim 1 wherein:
   the spacer has a rectangular cross-section, optionally with chamfered or rounded corners.
10. The turbine engine rotor of claim 1 wherein:
    the compartment has an axial length of 70% to 150% of said spacer axial length.
11. The turbine engine rotor of claim 1 wherein:
    there is no $MoS_2$ and/or graphite coating at an interface of the spacer and hub or an interface of the spacer and the nut.
12. The turbine engine rotor of claim 1 wherein:
    the spacer is a non-split full annulus.
13. A gas turbine engine including the turbine engine rotor of claim 1 wherein the rotor is a high pressure compressor rotor and further comprising:
    a high pressure turbine rotor co-spooled with the high pressure compressor rotor and coupled to the high pressure compressor rotor via an outer hub of the high pressure compressor rotor surrounding the hub.
14. A method for using the turbine engine rotor of claim 1, the method comprising:
    driving rotation of the rotor; and
    the driving causing a fracture of the spacer and the outer wall inner diameter surface containing fragments of the fracture.
15. A turbine engine rotor comprising:
    a central shaft;
    a disk stack having a plurality of disks encircling the shaft and having a hub mounted to the shaft;
    a nut threaded to the shaft; and
    a spacer between the hub and the nut, the nut holding the stack in compression via the spacer, wherein:
    the spacer has a rectangular cross-section, optionally with chamfered or rounded corners; and
    the hub has a compartment at least partially containing the spacer with an outer wall inner diameter surface facing an outer diameter surface of the spacer.
16. A gas turbine engine including the turbine engine rotor of claim 15 wherein the rotor is a high pressure compressor rotor and further comprising:
    a high pressure turbine rotor co-spooled with the high pressure compressor rotor and coupled to the high pressure compressor rotor via an outer hub of the high pressure compressor rotor surrounding the hub.
17. A turbine engine rotor comprising:
    a central shaft;
    a disk stack having a plurality of disks encircling the shaft and having a hub mounted to the shaft;
    a nut threaded to the shaft; and
    a spacer between the hub and the nut, the nut holding the stack in compression via the spacer, wherein:
    the hub has a compartment at least partially containing the spacer with an outer wall inner diameter surface facing an outer diameter surface of the spacer; and
    the spacer has an axial length and the compartment has an axial length of 70% to 150% of said spacer axial length.
18. A gas turbine engine including the turbine engine rotor of claim 17 wherein the rotor is a high pressure compressor rotor and further comprising:
    a high pressure turbine rotor co-spooled with the high pressure compressor rotor and coupled to the high pressure compressor rotor via an outer hub of the high pressure compressor rotor surrounding the hub.
19. A method for manufacturing a turbine engine rotor, the turbine engine rotor comprising:
    a central shaft;
    a disk stack having a plurality of disks encircling the shaft and having a hub mounted to the shaft;
    a nut threaded to the shaft; and
    a spacer between the hub and the nut, the nut holding the stack in compression via the spacer, wherein:
    the hub has a compartment at least partially containing the spacer with an outer wall inner diameter surface facing an outer diameter surface of the spacer,
    the method comprising:
    interference fitting the spacer to the compartment;
    after the interference fitting, assembling the hub to the shaft; and
    after the assembling, threading the nut to the shaft.
20. The method of claim 19 further comprising:
    applying force to precompress the hub to the shaft and/or pretension the shaft;
    threading or further threading the nut to the shaft while the force is applied; and releasing the force to the leave the nut holding the stack in compression via the spacer.

* * * * *